3,390,007
PROCESS FOR TREATING COLD WET SURFACES
AND RESULTING PRODUCTS
Richard B. Bonner and Robert M. Jorda, Houston, Tex.,
assignors to Shell Oil Company, New York, N.Y., a
corporation of Delaware
No Drawing. Filed Aug. 21, 1964, Ser. No. 391,296
8 Claims. (Cl. 117—132)

ABSTRACT OF THE DISCLOSURE

A process for treating cold and wet surfaces is disclosed. This process comprises applying a corrosion-resistant coating to a cold and wet surface on which dew is forming, by spraying onto the surface a mixture of a polyepoxide, an excess of a material possessing more than one amino hydrogen atom, an accelerator for the amine-epoxy reaction, and a solvent.

---

This invention relates to a process for treating surfaces which are wet and to the resulting products. More particularly, the invention relates to a new process for treating surfaces which are cold and wet to apply a corrosion-resistant coating thereto and/or repair defects in the said surfaces, and to the products prepared thereby.

Specifically, the invention provides a new and highly efficient process for applying a tough corrosion-resistant coating to cold wet surfaces on which dew is forming, such as may exist where the temperature is low and the humidity is high. The new process comprises forming a mixture of (1) a polyepoxide having more than one vic-epoxy group, and preferably a glycidyl polyether of a polyhydric phenol, (2) an excess amount of a material possessing more than one amino hydrogen, (3) an epoxy curing agent accelerator, and (4) a mutually miscible solvent, which mixture has a sprayable viscosity, maintaining the components of the solution in substantially homogeneous mutual contact until the onset of polymerization has produced a significant increase in the temperature of the solution, and during the time interval between temperature increase and a significant increase in the viscosity of the solution, applying the solution to the surface which is wet and cold.

As a special embodiment, the invention provides a new process for applying a hard, tough corrosion-resistant coating to metal surfaces of off-shore structures at a time when dew is forming thereon, which comprises cleaning the metal surface and then applying the above mixture as by spraying and allowing the coating to set hard while the dew continues to form.

One problem of long standing, particularly in the oil industry, is the application of paint to surfaces when the temperature of the surface is low and relative humidity is high. This problem is particularly acute in the painting of off-shore structure, tank batteries, flowlines, and marine and tank lining operations. The low temperature and high humidity combine to cause the continual presence of moisture on the substrate, and the low temperature increases the time required to cure most available coatings. The combination of moisture and low temperature has heretofore kept one from applying a satisfactory coating to these surfaces under the dew forming conditions.

It is an object of the invention, therefore, to provide a new process for treating wet surfaces. It is a further object to provide a new process for treating surfaces which are cold and wet and on which dew is forming. It is a further object to provide a new process for treating metal surfaces when the temperature is low and the humidity is high. It is a further object to provide a method for applying a hard tough corrosion resistant coating to surfaces which are exposed to moisture. It is a further object to provide a process for applying a protective coating to off-shore structures, tank batteries, flowlines and the like. It is a further object to provide a process for repairing defects in surfaces on which dew is forming. These and other objects of the invention will be apparent from the following detailed description thereof.

It has now been discovered that these and other objects may be accomplished by the process of the present invention which comprises forming a mixture of (1) a polyepoxide having more than one vic-epoxy group, and preferably a glycidyl polyether of a polyhydric phenol, (2) an excess amount of a material possessing more than one amino hydrogen, and preferably an amino-containing polyamide, (3) an epoxy curing agent accelerator, and (4) a mutually miscible solvent, which solution has a sprayable viscosity, maintaining the components of the solution in substantially homogeneous mutual contact until the onset of polymerization has produced a significant increase in the temperature of the solution, and during the time interval between temperature increase and a significant increase in the viscosity of the solution, applying the solution to the surface which is wet and cold. It has been found that by this special technique one is able to apply a corrosion-resistant coating to surfaces which are wet and cold and on which dew is continuing to form. Despite these adverse conditions, the coating very quickly sets up to a hard tough solvent resistant coating which has excellent adhesion to the treated surface. Evidence of such superior results is shown in the working examples at the end of the specification.

The polyepoxides to be used in the process of the invention comprise those compounds possessing more than one vicinal epoxy group, i.e., more than one

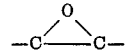

group. These compounds may be saturated or unsaturated, aliphatic, cycloaliphatic, aromatic or heterocyclic and may be substituted with substituents, such as chlorine, hydroxyl groups, alkoxy groups and the like. They may be monomeric or polymeric.

For clarity many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12 - octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxy hexyl) succinate, di(3,4-epoxybutyl) maleate, di(2,3-epoxyoctyl) pimelate, di(2,3-epoxybutyl) phthalate, di(2,-e-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di-(3,4-epoxyheptyl) sulfonyldibutyrate, tri(2,3-epoxybutyl)

1,2,4-butanetetradecyl maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids, such as, for example, dimethyl 8,9,12,13 - diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexanedecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxy cyclohexane-1,2,-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.) polyglycidyl ether of 1,1,5,5-tetrakis(hydroxyphenyl)pentane (epoxy value 0.514 eq./100 g.) and the like and mixtures thereof.

Another group of polyepoxides that may be used in preparing the emulsions comprises the glycidyl ethers of novalac resins which resins are obtained by condensing an aldehyde with a polyhydric phenol. A typical member of this class is the epoxy resin from formaldehyde 2,2-bis(4-hydroxyphenyl)propane novalac resin.

The material to be used to combined with the above-described polyepoxides comprise materials which act both as a surface active material to "dry" the surface as a material to convert the polyepoxide to an insoluble infusible form. Preferred materials include those organic materials possessing a plurality of amino hydrogen, i.e., a plurality of $$-\underset{|}{\overset{H}{N}}-$$

groups wherein N is an amino nitrogen. These include the aliphatic, cycloaliphatic aromatic or heterocyclic-polyamines as well as derivatives thereof as long as the derivative still contains the necessary amino hydrogen.

Examples of these materials include, among others, the aliphatic polyamines, such as, for example, ethylene diamine, diethylene triamine, triethylene triamine, tetraethylene pentamine, 1,4-aminobutane, 1,3-diaminobutane, hexamethylene diamine, 3-(N-isopropylamino)propylamine, N,N'-diethyl-1,3-propanediamine, hexapropylene heptamine, penta(1-methyl-propylene)hexamine, tetrabutylenepentamine, hexa-(1,1-dimethylethylene)-heptamine, di(1-methylbutylene)triamine, pentaamylhexamine, tri(1,2,2-trimethylethylene) tetramine, tetra(1,3-dimethylpropylene)pentamine, penta(1,5 - dimethylamylene)hexamine, penta-(1,2-dimethyl-1-isopropylethylene)hexamine and N,N'-dibutyl-1,6-hexanediamine.

Aliphatic polyamine coming under special consideration are the alkylene polyamines of the formula

$$H_2N(RNH)_nH$$

wherein R is an alkylene radical, or a hydrocarbon-substituted alkylene radical, and $n$ is an integer of at least one, there being no upper limit to the number of alkylene groups in the molecule.

Especially preferred aliphatic polyamines comprise the polyethylene polyamines of the formula

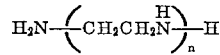

$$H_2N{-}\!\!\left(\!CH_2CH_2\overset{H}{N}\!\right)_{\!n}\!\!{-}H$$

wherein $n$ is an integer varying from about 2 to 8. Coming under special consideration are the polyethylene polyamines comprising 20–80% by weight of polyethylene polyamines having average molecular weights in the range of 200–500. These high molecular weight polyethylene polyamines normally start with tetraethylene pentamine and having related higher polymers which increase in complexity with increasing molecular weights. The remaining 80–20% of the mixture is diethylene triamine employed in such proportions that the mixture is fluid at about room temperature (60–90° F.).

The mixture of high molecular weight polyethylene polyamines is normally obtained as a bottom product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% diethylene triamine has the following analysis:

| | Percent of weight |
|---|---|
| Carbon | 51.5 |
| Nitrogen | 34.3 |
| Hydrogen | 11.6 |
| Oxygen | 2.5 | total basicity, equivalents per 100 grams=1.98, equivalent to 27.7% nitrogen.

| | |
|---|---|
| Active nitrogen | 81%. |
| Viscosity | 75–250 poises. |
| Equivalent weight | 42.5 to 47.5%. |

This mixture of polyamines will be referred to hereinafter as Polyamine H.

Other examples include the polyamines possessing cycloaliphatic ring or rings, such as, for example, 1-cyclohexylamino-3-aminopropane, 1,4-diaminocyclohexane, 1,3-diaminocyclopentane, di(aminocyclohexyl)methane, di(aminocyclohexyl)sulfone, 1,3 - di(aminocyclohexyl)propane, 4 - isopropyl - 1,2 - diaminocyclohexane, 2,4-diaminocyclohexane, N,N' - diethyl - 1,4 - diaminocyclohexane, and the like. Preferred members of this group comprise those polyamines having at least one amino or alkyl-substituted amino group attached directly to a cycloaliphatic ring containing from 5 to 7 carbon atoms. These cycloaliphatic amines are preferably obtained by hydrogenating the corresponding aromatic amine. Thus di(aminocyclohexyl)methane is obtained by hydrogenating methylene dianiline.

Another group of materials that may be used in process of the invention comprise the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkoxysilylpropylamines as triethoxysilylpropylamines.

Still another group comprises the aminoalkyl-substituted aromatic compounds, such as, for example, di(aminoethyl)benzene, di(aminomethyl)benzene, tri(aminoethyl)benzene, tri(aminobutyl)naphthalene and the like.

Still another group comprises the polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming polymers or copolymers having groups reactive with amines, such as, for example, aldehyde groups, as present on acrolein and methacrolein polymers, and reacting these materials with monomeric amines to form the new polymeric polyamines. Still other polymeric amines can be formed by preparing polymers containing ester groups, such as, for example, a copolymer of octadecene-1 and methyl acrylate, and then reacting this with a polyamine so as to effect an exchange of an ester group for an amide group and leave the other amine group or groups free. Polymers of this type are described in U.S. 2,912,416.

Still other materials include the N-aminoalkylpiperazines, such as, for example, N-aminobutylpiperazine, N-aminoisopropyl - 3 - butoxypiperazine, N-aminoethylpiperazine, 2,5 - dibutyl-N-aminoethylpiperazine, 2,5- dioctyl - N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Coming under special consideration, particularly because of the better control over the rate of cure obtained, are the acetone soluble derivatives of the above polyamines as may be obtained by reacting the above-described polyamines with other materials to remove some but not all of the active amino hydrogen.

A group of such materials include those acetone soluble products obtained by reacting the polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naththyl glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like.

This reaction between the polyamines and monoepoxide is effected by merely bringing the components together in proper proportions. The adducts are obtained when a mole of the polyamine is reacted with not more than one mol of monoepoxide. The excess amine can be retained or removed by distillation. Examples of the monoepoxide-polyamine reaction products include, among others, N-(hydroxypropyl) diethylene triamine (reaction product of propylene oxide and diethylene triamine) and N(2-hydroxy-4-phenoxypropyl) diethylene triamine (reaction product of phenyl glycidyl ether and diethylene triamine).

A group of related materials are those soluble fusible products obtained by reacting a polyepoxide with a monoamine. Examples of polyepoxides that may be used include any of those noted above for use in the compositions of the present invention. Examples of the monoamines include, among others, secondary amines as dimethylamine, diethylamine, dipropylamine, dibutylamine, di(tertbutyl)amine, dinonylamine, dicyclohexylamine, diallylamine, dibenzylamine, methylethylamine, ethylcyclohexylamine and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Another group of derivatives that may be used in the process of the invention include those soluble and fusible products obtained by reacting the polyamines noted above with unsaturated nitriles, such as, acrylonitrile. Examples of such products include the cyanoethylated diethylene triamine, cyanoethylated triethylene tetramine, cyanoethylated hexamethylene diamine, cyanoethylated 1,3-propanediamine and cyanoethylated 1,3 - diaminocyclohexane. Preferred species of the cyanoalkylated polyamines include those of the formula

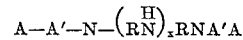

wherein $x$ represents an integer in the range of 0 through 3 and A and A′ represent a member selected from the group consisting of hydrogen and cyanoethyl radicals, and further characterized in that the amine has at least one cyanoethyl group and at least one nontertiary amino group in the molecule. Especially preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula

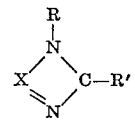

wherein X is an organic radical, and preferably an alkylene radical, R′ is a long chain hydrocarbon radical, and preferably one containing at least 12 carbon atoms, and R is an organic radical containing an amine or amine substituted group. Particularly preferred members of this group are those obtained by reacting any of the above-described polyamines with lone chain monocarboxylic acids, such as those containing at least 12 and preferably 16 to 30 carbon atoms, such as, for example, palmitic acid, pentadecanoic acid, 4 - ketomyristic acid, 8,10-dibromostearic acid, margaric acid, stearic acid, alpha-chlorostearic acid, linoleic acid, oleic acid, dihydroxystearic acid, arachidic acid, cluopanodonic acid, benhenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about .3 to .7 to 1, and preferably about .3 to .5 to 1. The temperature employed preferably varies from about 100° C. to 250° C.

Still other examples include the sulfur and/or phosphorus containing polyamines, such as may be obtained by reacting a mercaptan or phosphine containing active hydrogen with an epoxy halide to form a halohydrin, dehydrochlorinating and then reacting the resulting compound with a polyamine. N-(3-ethylthio-2-hydroxypropyl) diethylene triamine may be prepared, for example, by reacting ethyl mercaptan with epichlorohydrin, dehydrochlorinating and then reacting the resulting epoxy compound with diethylene triamine. Suitable examples of such compounds, include, among others, N-(3-butylthio-2-hydroxypropyl)triethylene tetramine, N-(4-phenylthio-3-hydroxybutyl)pentamethylene tetramine, N-(4-cyclohexylthio-3-hydroxybutyl)ethylene diamine, N-(3-cyclohexylthio - 2 - hydroxypropyl)hexamethylene diamine, N-(3-diphenylphosphino-2-hydroxypropyl)triethylene tetramine, N-(3-dicyclohexylphosphino-2-hydroxypropyl)pentamethylene tetramine, N-(3-didodecylphosphino-3-hydroxyhexyl)diethylene triamine, and 3-(allylthio-2-hydroxypropyl)hexamethylene diamine. Coming under special consideration are the N(alkylthiohydroxyalkyl) aliphatic and aromatic polyamines, the N-(cycloalkylthiohydroxyalkyl) aliphatic and aromatic polyamines and the N-(arylthiohydroxyalkyl) aliphatic and aromatic polyamines. Preferred phosphorus containing curing agents include the N-(dialkylphosphinohydroxyalkyl) aliphatic and aromatic polyamines, the N-(dicycloalkylphosphinohydroxyalkyl) aliphatic and aromatic polyamines, and the N-(diarylphosphinohydroxyalkyl) aliphatic and aromatic polyamines.

Still other derivatives that may be employed include those obtained by reacting the polyamines with acrylates, such as methyl acrylate, ethyl acrylate, methyl methacrylate and the like. In this case there is an exchange of the ester linkage for an amide linkage, one of the polyamine nitrogen being involved in the said amide linkage.

Particularly preferred polyamines and derivatives to be used with the above-described polyepoxides comprise the aliphatic and cycloaliphatic polyamines of the formula

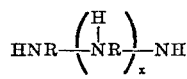

wherein $x$ is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acids containing up to 20 carbon atoms.

Other amino-nitrogen-containing curing agents the polyamides and particularly the reaction products of a polycarboxylic acid containing at least 7 carbon atoms and preferably those containing at least seven carbon atoms between the acidic groups, and an aliphatic polyamine, the resulting product possessing a group reactive with epoxy groups, such as, for example, free amino groups or free carboxyl groups.

Examples of polybasic acid materials used in making these polyamides include, among others, 1,10-decanedioic acid, 1,12-dodecadienedioic acid, 1,20-eicosadienedioic acid, 1,14-tetradecanedioic acid, 1,18-octadecanedioic acid and dimerized and trimerized unsaturated fatty acids obtained by heating polymerizing drying oil fatty acids under known conditions. Normally, this is effected by utilizing the lower aliphatic esters of drying oil esters so as to prevent decarboxylation during the heating period. During the heating period, dimers and trimers are usually obtained. The process is illustrated in the "Industrial and Engineering Chemistry," vol. 38, page 1139 (1946). The structures of the products so obtained are believed to be those given in "Industrial Engineering Chemistry," vol. 33, page 89 (1941). Numerous drying oil acids can be used in preparing the polymerized acids, but the preferred acids are those containing from 16 to 25 carbon atoms, such as, for example, linoleic acid, linolenic acid, eleostearic acid, and licannic acid, such as may be derived from oils, such as soybean oil, linseed oil, tung oil, perilla, oiticica, cottonseed, corn, tall, sunflower, dehydrated castor oil and the like. The expression "polymerized unsaturated fatty acids" as used herein in a generic sense is intended to include the polymerized mixture of dimerized acids, trimerized acids, higher polymerized acids as well as small portions of residual monomer.

The aliphatic polyamines used in preparing the polyamides may be any di-, tri- or polyamine such as, for example, ethylene diamine, diethylene triamine, triethylene tetramine, tetraethylene pentamine, 1,4-diaminobutane, 1,3 - diaminobutane, hexamethylene diamine, 3-(N-isopropylamino)propylamine, and the like. Particularly preferred polyamines are those containing from 2 to 12 carbon atoms, and especially those of the formula

wherein $x$ is an integer of 0 to 10 and R is a bivalent hydrocarbon radical containing from 1 to 10 carbon atoms. Coming under special consideration are those polyamines having at least 3 atoms intervening between the amine groups principally involved in the amidification reaction. These three atoms may be carbon atoms or hetero atoms, such as nitrogen atoms.

Especially preferred polyamides are those derived from the aliphatic polyamides containing no more than 12 carbon atoms and polymeric fatty acids obtained by dimerizing and trimerizing ethylenically unsaturated fatty acids containing up to 24 carbon atoms. These preferred polyamides have a viscosity between 10 and 1750 poises at 40° C., and preferably 20 to 250 poises at 40° C. Preferred polyamides also have amine values between 50 and 450. Amine number is number of milligrams of KOH equivalent to the free amino group present in one gram of the polyamide.

Coming under special consideration are the fluid polyamides produced by the condensation of polymerized linoleic acid with an aliphatic polyamine, e.g., diethylene triamine, and having the following properties: amine value 210–230, a viscosity of 500–750 poises at 40° C., specific gravity of 0.99 and weighing about 8.3 pounds per gram.

The polyamides used in the process of the invention preferably possess at least one and more preferably two or more hydrogen attached to amino nitrogen atoms or carboxyl hydrogen atoms. Such products are obtained by controlling the proportion of reactants so that there is always at least one amino hydrogen or carboxyl group, such as, for example, by using an excess of the polyamine reactant. A process for making such polyamides (to obtain free amino groups) or an excess of acid (to obtain carboxyl groups) is illustrated in U.S. 2,450,940 and U.S. 2,695,908 and so much of these patents relative to the preparation of the polyamides is incorporated herein by reference.

The other component to be used in the process of the invention comprises an accelerator for the epoxy resinamine cure. A great variety of different materials may be used for this purpose. Examples of suitable materials include, among others, tertiary amines, phenols, mercaptans, sulfides, acids, thiols, phosphines, salts, amides and the like. Particularly preferred are the phenols which may be monohydric or polyhydric, substituted or unsubstituted. Examples of the phenols include, among others, phenol, isopropylphenol, nonyl phenol, octyl phenol, dodecyl phenol, resorcinol, 2,2-bis(4-hydroxyphenyl)propane, 2,2-bis(4-hydroxyphenyl) butane and the like, and mixtures thereof.

The amount of the components to be used in the process may vary within certain limits. The amount of the amino-containing curing agent should be freely available to "dry" the surface, and as a result should be used in at least a 5% stoichiometric excess and not more than 50% stoichiometric excess in relation to the polyepoxide. As used herein and in the appended claims stoichiometric amount refers to that amount needed to funish one amino hydrogen for every epoxy group to be reacted. Particularly superior results are obtained when the curing agent is employed in from 10% to 40% stoichiometric excess.

The amount of the accelerator may also vary within certain limits depending on the nature of the accelerator and the amino-containing curing agent. In general, the amount of the accelerator may vary from about .01% to about 10%, and more preferably from about .1% to 5% by weight of the polyepoxide being cured.

Other materials that may be used in the initial mixture include those which tend to extend the polyepoxide, but do not seriously affect the properties of the cured product, such as, for example, coal tars, asphalts, road oils, extracts and distillates, middle oil, refined coal tars, pine tar, pine oil, and the like as well as other types of resins as phenol-aldehyde resins, phenol-urea resins, polythiopolymercaptans, vinyl resins, polyolefins, synthetic rubbers, and the like and mixtures thereof. These other materials are preferably employed in amounts less than about 60% by weight of the polyepoxide, and more preferably not more than 40% by weight.

A mutually miscible solvent is also employed in making the initial mixture of sprayable viscosity. By sprayable viscosity is meant a viscosity suitable for spraying, without severe spattering, with a conventional compressed air paint spray gun. Solvents that may be used for this purpose include the alcohols, such as methanol, methyl acetate, acetonitrile, and the like. Methanol is by far the more preferred solvent to be utilized.

According to the process of the invention, the above-described polyepoxide, curing agent possessing more than one amino hydrogen, accelerator, solvent and any other desired material as noted above, are first thoroughly mixed together. This may be accomplished by combining the components together in any order and stirring or otherwise mixing the components. Mixtures of polyepoxides, mixtures of curing agents and mixtures of accelerators may be used as desired. In addition, one or more of the components may be mixed together before being added to the final reaction mixture. It is generally preferred to combine the polyepoxide and solvent in one component and curing agent, accelerator and solvent in another and then combine the two components just before application is needed.

The above mixing is preferably accomplished at ambient temperature, but heat may be applied in some cases to accelerate the mixing.

After the above-noted components have been combined in any order, the components are then kept in substantially homogeneous mutual contact until the onset of polymerization has produced a significant increase in the temperature of the solution. This homogeneous mutual contact may be maintained by stirring, shaking or otherwise keeping the components in contact until the desired increase in temperature.

As the reaction is exothermic, the temperature of the mixture will begin to rise as soon as the reaction gets underway. This will generally take place a few minutes after the components have been mixed together. The amount of temperature rise permitted before the mixture is applied to the cold wet surface will preferably be between 10° F. and 20° F. As the temperature rise is accompanied by a rise in viscosity, it is important that the temperature rise not be taken beyond that point where the solution is too thick for proper application to the cold wet surface. The viscosity should not be permitted to exceed that point where the solution can be easily applied as by spraying, brushing and the like.

The application of the above solution to the cold wet surface may be accomplished in any desired manner. As the solution is still sprayable, it is generally preferred to spray the solution onto the wet surface. Other means, however, such as painting, rolling, dipping and the like may be used as desired.

The conditions under which the application is made may vary over a wide range. In general, the temperature will be low, e.g., 15° C. or below, and the humidity will be relatively high, e.g., 60% to 100% humidity. The surfaces to be coated will thus be cold and the moisture will be collecting on the surface. The surface may be wet or the moisture may just be beginning to collect at the time of application. The water may be saline or fresh water depending on the location of the surface to be coated.

The thickness of the coating on the surface will depend on the desired need of the application. The coating may, for example, vary from just a few mils thickness up to as high or higher than ⅛ inch. Thicker films may be obtained by repeated application of the coating. This is particularly desirable in the case of spraying as one film may be sprayed on the surface, dried and then another film sprayed on top until the desired thickness is obtained.

If the surface to be coated has already been corroded or is coated with oil, etc. it is preferred to clean the surface before application of the coating. This may be accomplished by any suitable means, as steel brushing, sandblasting, etching with acids, cleaning with organic solvents and the like.

After the material has been coated with the above-noted composition, the coating is allowed to set until it has become cured to the insoluble, infusible stage, i.e., is insoluble in acetone and does not soften when heated say to 100° C. The curing takes place at ambient temperatures so no external steps need be taken to effect cure. Heat, of course, will speed the cure, and if possible, applications, such as heat lamps and the like, might be utilized to speed the setting up of the coating. Under ordinary application conditions, the coating will generally harden by being allowed to set in a few hours after mixing.

The process of the invention is particularly adapted for protection of surfaces made of metal, wood, glass, plastic, cement and the like, but can be used on any type of surface. The process is especially effective when the surface is metal such as iron. The surfaces may be present on any type of object, such as, for example, offshore structures, tanks, pipes, boats, and the like. The coatings can also be applied to boat hulls, wood, metal, glass or plastic surfaces which would need water-proofing, etc.

As noted, the process is also effective for repairing defects in surfaces, such as holes, cracks, and the like. This is accomplished by merely preparing the composition as noted above and then applying the composition to the defective surface. If the defects are very fine cracks, and the wet surfaces are not exposed to too much action of the water, the composition may be sufficient to fill the cracks and defects. If the cracks are very large and/or if the action of the water is very strong it may be necessary to employ the composition in the form of a thick putty to form an initial coating and then spraying on the composition as noted above.

To illustrate the manner in which the invention may be carried out, the following examples are given. It is to be understood, however, that the examples are for the purpose of illustration and the invention is not to be regarded as limited to any of the specific materials or conditions recited therein. The resins defined by letter are those described in U.S. 2,633,458.

Example I

This example illustrates the preparation of a coating compostion containing Polyether A, a polyamide and triphenyl phosphite, and the use of this composition for the treatment of cold wet steel pipes on which dew was forming.

Composition A was prepared by mixing the following components together in the parts indicated:

| | Parts |
|---|---|
| Polyether A (glycidyl polyether of 2,2-bis(4-hydropyphenyl)propane) | 70 |
| Methanol containing Alizarin blue | 7 |
| Triphenyl phosphite | 6.5 |

Composition B was prepared by mixing the following components together in the parts indicated:

| | Parts |
|---|---|
| Polyamide of dimerized linoleic acid and diethylene triamine having an amine value 306 | 70 |
| Methanol containing Brilliant yellow | 17.4 |
| Phenol | 1.5 |

The above amounts of the two components were mixed together and stirred well. A time lapse of 20 minutes was allowed during which time the paint was stirred. During this time the temperature increased by about 15° F. The mixture was then ready for spraying.

The pipe to be sprayed had been previously cleaned by vapor blasting, the temperature was reduced by cooling with water maintained at from 44° F. to 51° F. Equilibrium was reached when sufficient moisture was condensed from the atmosphere to be dripping off the pipe. The pipe was then wiped off so that it was wet but not dripping. The above solution was then sprayed onto the wet pipe. The coating was then allowed to stand (with the moisture still condensing). In two hours, the coating had undergone considerable cure, and at the end of 6 hours, the film was ready for a second coat. It was generally found that a heavy coating was desired, and a second coat was applied.

The pipe coated as above was then immersed in aerated, synthetic sea water for about 8 weeks at about 20° C. An uncoated pipe under the same conditions exhibited severe corrosion while the pipe coated as above exhibited none.

Other similar tests were completely successful where the cooling water temperatures were maintained as low as 31 to 35° F. Further, completely successful tests were made with mill-scale coated pipes which had simply been degreased prior to its application of the coating.

The above process was also used to coat an iron water tank stored in the open which had corroded severely but was not able to be painted because of the dew formation. The tank was easily coated by the above technique and did not show any subsequent corrosion.

Example II

Example I is repeated with the exception that Polyether A was replaced with an 85–15 mixture of Polyether A and butyl glycidyl ether. Related results are obtained.

Example III

Example I is repeated with the exception that Polyether A was replaced with diglycidyl ether of resorcinol. Related results are obtained.

Example IV

Example I is repeated with the exception that the polyamine is replaced with 1-cyclohexylamino-3-aminopropane. Related results are obtained.

Example V

Example I is repeated with the exception that the curing agent employed is an adduct of diethylene triamine and ethylene oxide. Related results are obtained.

Example VI

Example I is repeated with the exception that phenol is 2,2-bis(4-hydroxyphenyl)propane. Related results are obtained.

We claim as our invention:

1. A process for treating cold wet surfaces on which dew is forming to form a tough corrosion-resistant coating thereon which comprises forming a mixture of (1) a polyepoxide having more than one vic-epoxy group, (2) 5% to 50% stoichiometric excess of a material possessing more than one amino hydrogen atom, (3) a monohydric phenol, and (4) methanol, said mixture having a sprayable viscosity, maintaining the components of the solution in mutual contact until the onset of polymerization has produced an increase in temperature of at least 8 degrees, centigrade scale, and then before the viscosity has increased over 100 poises, spraying the solution to the wet cold surface and allowing the solution to set to a hard film.

2. A process for treating cold wet surfaces on which dew is forming to form a tough corrosion-resistant coating thereon which comprises forming a mixture of (1) a polyepoxide having more than one vic-epoxy group, (2) 5% to 50% stoichiometric excess of an amino-hydrogen containing polyamide, (3) a monohydric phenol, and (4) methanol, the methanol being in sufficient amount to form a sprayable solution, maintaining the components of the solution in mutual contact until the onset of polymerization has produced an increase in temperature of at least 8 degrees, centigrade scale, and then before the viscosity has increased over 100 poises, spraying the solution on the wet cold surface and allowing the solution to set hard.

3. A process as in claim 2 wherein the polyepoxide is a glycidyl polyether of an unsubstituted polyhydric phenol having an epoxy equivalency of more than 1.0 and a molecular weight between 250 and 900.

4. A process as in claim 2 wherein the polyamide is a reaction product of a polymerized unsaturated fatty acid and an aliphatic polyamine.

5. A process as in claim 2 wherein the surface to be coated is a metal surface.

6. A process for treating cold wet surfaces on which dew is forming which comprises forming a mixture of (1) a glycidyl polyether of a polyhydric phenol, (2) from 5% to 50% stoichiometric excess of an amino hydrogen containing polyamide, (3) a monohydric phenol, and (4) methanol, said mixture containing sufficient methanol to be sprayable, maintaining the components of the solution in mutual contact until the onset of polymerization has produced an increase of at least 8 degrees, centigrade scale, and then before the viscosity has increased over 100 poises, spraying the solution onto the wet cold surface and allowing the solution to set hard.

7. A process as in claim 6 wherein the monohydric phenol is phenol.

8. A process as in claim 6 wherein the glycidyl polyether is a glycidyl polyether of 2,2-bis(4-hydroxyphenyl) propane.

References Cited

UNITED STATES PATENTS

| | | | |
|---|---|---|---|
| 2,824,078 | 2/1958 | Mellick | 117—161 X |
| 2,829,984 | 4/1958 | Yaeger | 117—132 |
| 2,880,194 | 3/1959 | Glaser | 117—132 X |
| 2,990,383 | 6/1961 | Glaser | 117—132 X |
| 3,140,566 | 7/1964 | Wagner | 156—71 |
| 3,160,518 | 12/1964 | Jorda | 117—2 X |

OTHER REFERENCES

Skeist: Epoxy Resins, Reinhold Publishing Corp., 1958, p. 45.

RALPH S. KENDALL, *Primary Examiner.*